(No Model.)
W. L. PIKE.
NUT LOCK FOR BUGGY TOPS.
No. 470,630. Patented Mar. 8, 1892.
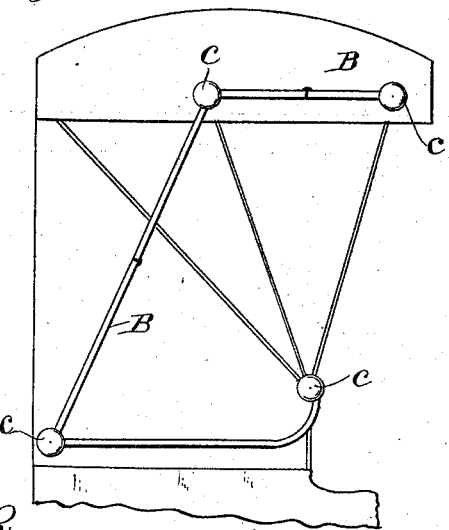
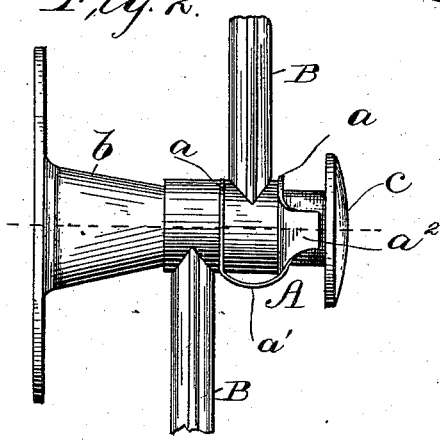
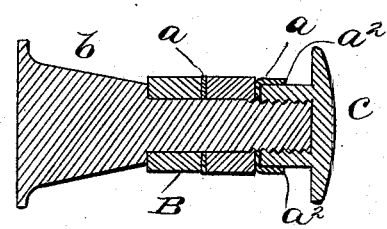
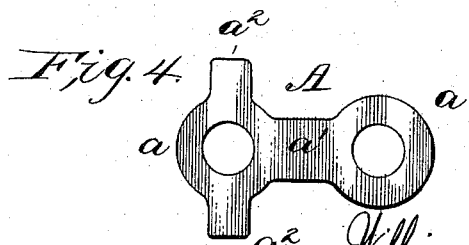
Witnesses
W. E. Bowen
Mercer Myers
Inventor
William L. Pike
By Myers & Co
Attorneys

United States Patent Office.

WILLIAM L. PIKE, OF GROTON, NEW YORK.

NUT-LOCK FOR BUGGY-TOPS.

SPECIFICATION forming part of Letters Patent No. 470,630, dated March 8, 1892.

Application filed October 29, 1891. Serial No. 410,214. (No model.)

*To all whom it may concern:*

Be it known that I, WILLIAM L. PIKE, a citizen of the United States of America, residing at Groton, in the county of Tompkins and State of New York, have invented certain new and useful Improvements in Nut-Locks for Buggy-Tops, of which the following is a specification, reference being had therein to the accompanying drawings.

My invention relates to an improved lock or fastening for buggy-top props or braces, having for its object to prevent the accidental releasing or unscrewing of the securing-nuts, more especially the lower ones, of the props or braces; and it consists in the detailed construction of the lock or fastening, substantially as hereinafter more fully disclosed, and pointed out in the claim.

In the accompanying drawings, Figure 1 is a side view of a buggy-top showing the prop or brace to which my invention is applied. Figs. 2, 3, and 4 are enlarged detailed views of the invention.

In the organization of my invention I strike or stamp up the fastening from a plate of sheet metal into the form of a blank A with apertured end portions $a\ a$, an intermediate rectangular portion $a'$, and lateral or wing portions $a^2$ at one end thereof. The end portions $a\ a$ are bent at right angles to the portion $a'$ and with their apertures in alignment, permitting the slipping of the same on the short pivots or bolt-like projections $b$ of the buggy-top, the lower hub end of one of the props or braces B, however, being first inserted between said end portions and slipped on said pivots with the fastening, the latter thus embracing said hub end of the prop.

The lateral or wing portions $a^2$ of the fastening, after the screwing of the nut $c$ upon the pivot or projection $b$, are bent down upon said nut, thus locking or securing the latter in place against being jarred off of the pivot or the liability of the turning off of the nut with the lowering of the props or braces.

It is also obvious that the fastening is equally applicable to the nuts of railway-rail fastenings, one nut being first inserted between the end portions and slipped on the securing-bolt with the fastening and then bending the lateral or wing portions of the latter upon a second nut after the screwing thereof upon the bolt.

Having thus described my invention, what I claim, and desire to secure by Letters Patent, is—

In a nut-lock for buggy-tops, the blank having bolt-apertured end portions bent at right angles to an intermediate rectangular portion and lateral or wing portions extending from one of said apertured end portions and adapted to be bent up to embrace the side faces of an overlying nut, substantially as and for the purpose set forth.

In testimony whereof I affix my signature in presence of two witnesses.

WILLIAM L. PIKE.

Witnesses:
T. F. FITZ PATRICK,
E. F. KAVANAUGH.